UNITED STATES PATENT OFFICE.

ALEXANDER S. RAMAGE, OF BUFFALO, NEW YORK.

METHOD OF MAKING PAINTS.

1,008,434. Specification of Letters Patent. Patented Nov. 14, 1911.

No Drawing. Application filed March 7, 1911. Serial No. 612,762.

*To all whom it may concern:*

Be it known that I, ALEXANDER S. RAMAGE, a citizen of the United States, residing at Buffalo, in the county of Erie and State of New York, have invented certain new and useful Improvements in Methods of Making Paints, of which the following is a specification.

This invention relates to the manufacture of paints, enamels and like compositions, the object of the invention being the provision of a method whereby such compositions may be prepared from suitable pigments in a single operation and without the expensive steps of washing and drying the pigment, bolting or sifting, and oil-grinding.

According to the method, the pigment is first compounded or combined while suspended in water with a substance having a repellent effect upon water, as a fatty acid, and is then directly treated with oil or other appropriate vehicle to prepare the paint. The method is applicable to all pigments and to a wide variety of vehicles. It will be described by reference to certain specific embodiments thereof, it being understood that the invention is not thereby limited.

The method is particularly applicable in practice to the preparation of paints from such delicate colors as the chrome yellows, chrome greens, para-reds, and the like.

According to the preferred mode of practicing the invention the pigment, suspended in or mixed with water, is intimately mixed with a suitable soap, usually a stearate or oleate soap or a mixture of these, the soap being previously dissolved in water. A suitable proportion of soap is from 5 to 30 per cent. by weight of the pigment, but this proportion may be varied according to the character and uses of the paint. For example, for a flat paint to be mixed with turpentine or rosin spirit and to be used without oil, a comparatively large proportion of soap may be used, say from 20 to 30 per cent.; on the other hand, for the purpose of combining with oil, the smaller proportions of soap are preferred. If the pigment does not contain any basic lead compound, the dissolved excess of the soap is precipitated by means of a solution of lead acetate or nitrate, or other suitable salt yielding an insoluble metallic soap. The pigment is then run off, or filter-pressed, and the wet color is charged into a paint-chaser, putty-mixer or equivalent device, and the paint vehicle or oil added. In a few minutes the pigment combines with the oil, and the water separates and is run off. The resulting oil paste can be thinned in the usual way with any desired paint vehicle, and is ready for use. The effect of the foregoing treatment is to combine with the pigment a certain proportion of a substance such as stearate or oleate of lead which has a water-repellent character and at the same time an affinity for oil, whereby the replacement of the water by the oil is greatly facilitated. Lead pigments thus prepared can be mixed with rosin varnish without livering.

As one specific example of the invention, I will describe the preparation of a lemon chrome yellow: 100 pounds of lead nitrate, or 104 pounds of lead acetate, are dissolved in water, and 20 pounds of dissolved potassium bichromate containing 14 pounds of commercial sulfuric acid are added. The lemon chrome thus precipitated is allowed to settle, after which the supernatent liquor is run off and a solution of 8 pounds of tallow soap is added to the pigment and thoroughly incorporated therewith. A solution of 5 pounds of lead acetate is now added, and the pigment filtered and washed. In the case of delicate colors, it is preferable to add the last-mentioned solution of lead acetate before the addition of the soap, particularly in case the soap contains any free alkali. The foregoing reactions may be facilitated by gentle heating. The pulp is then placed in a chaser and the requisite amount of oil added. In a few minutes the pigment combines with the oil to form a stiff paste and the water runs off. The paste may be thinned with any of the usual paint vehicles, or with varnish in case it is desired to prepare enamels. The product so obtained is in a state of extremely fine subdivision, being much finer than can be secured by grinding. In the case of the basic chrome pigments, or other basic lead salts, the basic component of the pigment combines with the soap, rendering unnecessary the use of a lead salt as a precipitant for the soap. In a similar manner chrome greens may be prepared, but in the preparation of these colors it is preferred to add the precipitating lead salt to the pigment before the addition of the soap, in order to avoid injury to the color by the reaction of any free alkali in the soap upon the Prussian blue of the pigment. For such greens, the proportion of soap required is usually greater than for the heavier colors, and is in general proportionate to the amount of Prussian blue in the pigment. For example, it is found that five per cent. by weight of soap is sufficient for a chrome yellow pigment, whereas with a light green ten per cent. is used, and with a deep green fifteen per cent. may be required.

For the preparation of diluted colors the procedure is as above described, the pigment being prepared in the usual way, and the soap and precipitant thereafter added. In the case of red lead the pigment is merely suspended in the soap solution, preferably heated, until the PbO component combines with the stearic or oleic acid, whereupon the pigment is run off onto cheese-cloth and the pulp placed in the chaser with oil. In the case of iron oxid reds prepared by roasting copperas, it is sufficient to grind the pigment with water and to add the solution of soap. Such pigments always contain undecomposed ferric sulfate which acts as a precipitant for the organic acid. The pigment is then at once filtered and the wet pulp treated directly with oil as before. Venetian reds are mixed with water and the soap solution added. The lime present precipitates the soap as calcium stearate or oleate, and the subsequent treatment is as with the other pigments.

Paints may be prepared in accordance with this method without injury even to the most delicate colors, and the resulting films are found to be much more lasting than the films produced by the color and linseed oil alone, not disintegrating on exposure to the elements or under the action of dilute acids. The paints are also found to be well adapted for waterproofing cement, and for the protection of metals.

I claim:

1. The method of making paints, which consists in compounding a pigment with a metallic soap, in presence of water, and then displacing water from the resulting mass by mixing the same with oil or an equivalent paint vehicle.

2. The method of making paints, which consists in effecting a reaction, in presence of water, between a basic lead pigment and an organic acid radical capable of yielding insoluble lead soaps, and then displacing water from the resulting mass by mixing the same with oil or an equivalent paint vehicle.

3. The method of making paints, which consists in compounding a pigment, a water-soluble soap, and a precipitant for said soap, in presence of water, and then displacing water from the resulting mass by mixing the same with oil or an equivalent paint vehicle.

In testimony whereof, I affix my signature in presence of two witnesses.

ALEXANDER S. RAMAGE.

Witnesses:
    CHARLES F. HOUCK,
    FRED C. HOUCK.